W. M. MOSELEY.
SPRING CHUCK.
APPLICATION FILED DEC. 1, 1911.
1,086,393.
Patented Feb. 10, 1914.
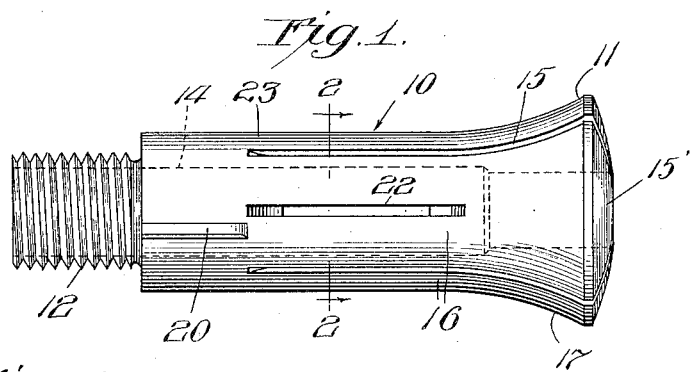
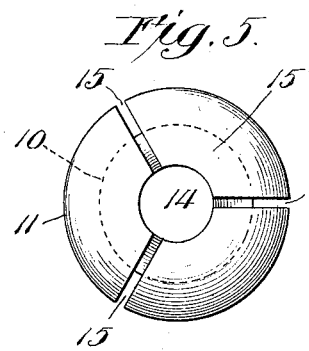
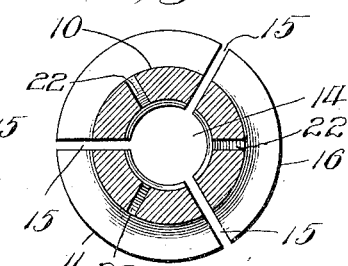
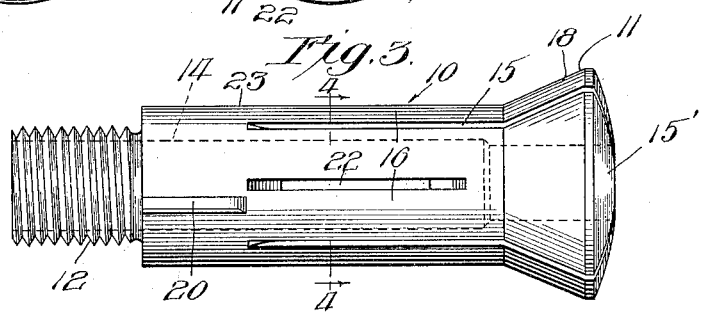
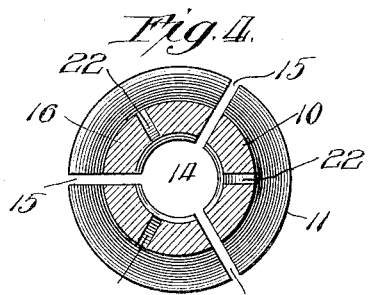
Witnesses:
Harry S. Gaither
G. E. Dowle
Inventor:
William M. Moseley
by William H. Hace
Atty
COLUMBIA PLANOGRAPH CO., WASHINGTON, D. C.

UNITED STATES PATENT OFFICE.

WILLIAM M. MOSELEY, OF ELGIN, ILLINOIS.

SPRING-CHUCK.

1,086,393.      Specification of Letters Patent.      Patented Feb. 10, 1914.

Application filed December 1, 1911. Serial No. 663,185.

*To all whom it may concern:*

Be it known that I, WILLIAM M. MOSELEY, a citizen of the United States, and a resident of Elgin, in the county of Kane and State of Illinois, have invented certain new and useful Improvements in Spring-Chucks; and I do hereby declare that the following is a full, clear, and exact description thereof, reference being had to the accompanying drawings, and to the characters of reference marked thereon, which form a part of this specification.

This invention relates to improvements in that class of spring jaw chucks used in lathes, milling machines, screw machines, etc., which while differing somewhat in form yet in general are slotted to form spring jaws adapted for movement either inward or outward against the work to hold or clamp the work which may be placed within the chuck, or which may be placed over the same, the said jaws of the chuck being actuated to effect the clamping or holding action thereof on the work by suitable parts on the machine which coöperate with said jaws in the act of tightening the chuck on the work.

The object of the invention is to provide improvements in chucks of this class designed to increase the flexibility of the jaws without weakening the same, and without changing the condition of the bearing contact of the chuck upon either the work or the lathe spindle by which the chuck is held, so as to better adapt the chuck for the work it has to perform, as more fully explained hereafter.

This invention consists in the matters hereinafter set forth and more particularly pointed out in the appended claims.

In the drawings:—Figure 1 is a side elevation of a chuck embodying my invention. Fig. 2 is a transverse section on the line 2—2 of Fig. 1. Fig. 3 is a side elevation of a slightly modified form of chuck. Fig. 4 is a transverse section on the line 4—4 of Fig. 3. Fig. 5 is an end view of the chuck.

As shown in the drawings the chuck comprises a body portion 10, which is as shown made cylindrical, a head 11 at one end of the body and a screw-threaded portion 12 at the other end of the body. Said chuck has a longitudinal bore 14 to receive the work to be held thereby, which as herein shown is an axial bore. As herein shown, said bore may be formed by making the chuck tubular from end to end, with the front end of the bore of reduced diameter to constitute the bearing portion of the chuck. This form of the bore permits the work to be introduced through the rear end of the chuck, as well as from the front end thereof.

The chuck body and head are longitudinally slotted at angularly spaced points 15 from a point near the rear end of the chuck body outwardly to and through the front face 15' of the head. The slots 15 extend radially to the bore 14 and provide a plurality of spring jaws 16, 16 which permit the free or headed ends of the jaws to be closed inwardly upon the work that is inserted into the axial bore.

The head is exteriorly enlarged or made flaring to engage the mouth of the ordinary hollow lathe spindle, when the chuck is drawn backwardly into the spindle by the action of the usual draw-in spindle or other means, as is common in lathes of this type; the engagement of said flaring surface of the head against the mouth of the hollow spindle, when the chuck is drawn into said spindle, causing the jaws to be closed upon the work and to clamp the same. The flaring outline of the head 11 of the chuck shown in Figs. 1 and 2 is a concave, curved line 17, while the outline of the head 11 of the chuck shown in Figs. 3 and 4, is conical as indicated at 18, but the particular contour of the head is not material.

The chuck body is provided near its rear end with a slot 20 to receive the usual pin carried by the hollow spindle, by which to non-rotatively lock the chuck in the spindle, while permitting relative endwise movement of the chuck and lathe spindle in the act of tightening the chuck on the work.

In accordance with my invention I increase the radial and circumferential flexibility of the chuck by providing the shanks of the jaws thereof, and between the slots 15, with auxiliary slots 22, 22, which are made shorter than the slots 15. Said auxiliary slots extend inwardly to the bore 14 of the chuck, as do the main slots 15. They terminate at their rear ends short of the rear end of the body of the chuck and stop at their front ends short of the front ends of the main slots 15. These auxiliary slots, while not impairing the necessary longitudinal tensile strength of the chuck, afford a circumferential and radial flexibility and resiliency to the jaws not found in the ordinary chuck. By reason of the fact that said auxiliary slots do not extend to the outer face of the chuck head, neither the contacting surface of the chuck jaws with the work nor of the jaws with the lathe spindle is changed, and, while said auxiliary slots give to the chuck, as a whole, greater radial and circumferential elasticity and resiliency, the head is not thereby weakened. The clamping action of the jaws, when closing upon the work in the chuck, takes place more nearly at the bases 23 of the jaws, which tends to cause the jaws to close on a longer radius than if the shanks of the jaws were unslotted, thus causing the sides of the bore to close more uniformly parallel upon the work, thereby facilitating the true seating of the work in the chuck. By reason of the increased resiliency and flexibility of the jaws, due to the auxiliary slots, there is also less liability of the jaws breaking, and also less liability of permanent setting of the jaws, particularly in cases where the chuck is being strained to hold work which is either larger or smaller than its normal capacity.

My improvements are adapted also to spring chucks wherein the jaws are forced outwardly against the work which inclose or partially inclose the chuck, and may be applied to chucks of both types of specifically different structural details from that herein shown.
I claim as my invention:—

1. A hollow spring chuck provided at one end with a head and at its other end with means for drawing the chuck endwise, said body and head being slotted longitudinally from their front faces rearwardly to a point short of the rear end of the body to provide an odd number of spring jaws, said jaws being each provided with an auxiliary slot which extends from a point in rear of the front face or head of the chuck rearwardly through the shanks of the jaws and which terminate short of the rear end of the said chuck, the main and auxiliary slots extending radially to the bore of the chuck.

2. A hollow spring chuck comprising a body having at one end an exteriorly flaring head and at its other end a screw-thread, the bore of the chuck extending from end to end of the chuck and being decreased in diameter at the head, said chuck being provided with three angularly spaced, longitudinal slots which extend partially through the length of the body and through the head to constitute three spring jaws having three point bearing at the head, and said jaws being provided with auxiliary, longitudinal slots which terminate at their outer ends short of the ends of the first slots and at their inner ends short of the said screw thread.

In testimony, that I claim the foregoing as my invention I affix my signature in the presence of two witnesses, this 27th day of November A. D. 1911.

WILLIAM M. MOSELEY.

Witnesses:
G. E. Dowle,
Harry S. Gaither.